United States Patent
Chang

(10) Patent No.: US 10,619,713 B2
(45) Date of Patent: Apr. 14, 2020

(54) REGULATION MECHANISM CAPABLE OF DYNAMICALLY ADJUSTING BALANCE OF TENSION OF TWO SIDES OF MULTI-GROOVE TRANSMISSION BELT BETWEEN DRIVING WHEEL AND DRIVEN WHEEL

(71) Applicant: SOLID FOCUS INDUSTRIAL CO., LTD., Taoyuan (TW)

(72) Inventor: Peter Chang, Taoyuan (TW)

(73) Assignee: SOLID FOCUS INDUSTRIAL CO., LTD., Taoyuan (TW)

( * ) Notice: Subject to any disclaimer, the term of this patent is extended or adjusted under 35 U.S.C. 154(b) by 315 days.

(21) Appl. No.: 15/832,812

(22) Filed: Dec. 6, 2017

(65) Prior Publication Data
US 2018/0363743 A1    Dec. 20, 2018

(30) Foreign Application Priority Data

Jun. 19, 2017   (TW) .............................. 106120379 A

(51) Int. Cl.
| | | |
|---|---|---|
| *F16H 7/12* | (2006.01) | |
| *F16H 7/02* | (2006.01) | |
| *F16H 7/08* | (2006.01) | |

(52) U.S. Cl.
CPC ............ *F16H 7/1281* (2013.01); *F16H 7/02* (2013.01); *F16H 2007/0806* (2013.01); *F16H 2007/088* (2013.01); *F16H 2007/0842* (2013.01); *F16H 2007/0865* (2013.01); *F16H 2007/0874* (2013.01); *F16H 2007/0893* (2013.01); *F16H 2007/0895* (2013.01); *F16H 2007/0897* (2013.01)

(58) Field of Classification Search
CPC .. F16H 7/12; F16H 7/1281; F16H 2007/0842; F16H 2007/0874
See application file for complete search history.

(56) References Cited

U.S. PATENT DOCUMENTS

| | | | | |
|---|---|---|---|---|
| 2,726,364 A | * | 12/1955 | Merritt ................. | H01H 35/006 318/475 |
| 3,926,063 A | * | 12/1975 | Mayfield ............... | F16H 7/1254 474/132 |
| 4,479,660 A | * | 10/1984 | Pattison ................. | B62M 1/36 280/261 |

(Continued)

*Primary Examiner* — Minh Truong
(74) *Attorney, Agent, or Firm* — Bacon & Thomas, PLLC

(57) ABSTRACT

The present invention is to provide a regulation mechanism capable of dynamically adjusting balance of tension on two sides of a multi-groove transmission belt between a driving wheel and a driven wheel, which includes a pivot balance plate pivotally connected to a transmission mechanism; two smooth idlers and a multi-groove idler pivotally connected on the pivot balance plate respectively and spaced apart from each other by a first gap and a second gap respectively; and a tension regulating rod rotatably disposed between the transmission mechanism and the pivot balance plate for dynamically adjusting balance of tension on the two sides of the multi-groove transmission belt, such that the multi-groove transmission belt can pass these gaps sequentially to wind on the driving wheel and the driven wheel, thereby the outer and inner side surfaces thereof are abutted with the smooth idlers and the multi-groove idler respectively.

4 Claims, 4 Drawing Sheets

(56) References Cited

U.S. PATENT DOCUMENTS

| | | | | |
|---|---|---|---|---|
| 4,850,934 | A * | 7/1989 | Gibson, Jr. | F16H 7/08 |
| | | | | 474/111 |
| 5,286,233 | A * | 2/1994 | Engelstad | A01D 46/085 |
| | | | | 474/101 |
| 6,179,740 | B1 * | 1/2001 | Walker | F16H 7/1254 |
| | | | | 474/134 |
| 6,857,978 | B2 * | 2/2005 | Polster | F16H 7/1209 |
| | | | | 474/134 |
| 7,494,434 | B2 * | 2/2009 | Mc Vicar | F16H 7/1281 |
| | | | | 474/101 |
| 9,709,137 | B2 * | 7/2017 | Walter | F02B 67/06 |
| 2003/0220164 | A1 * | 11/2003 | Tamai | F16H 7/1281 |
| | | | | 474/134 |
| 2017/0122414 | A1 * | 5/2017 | Takenaka | F16H 7/12 |
| 2019/0120344 | A1 * | 4/2019 | Kim | F16H 7/1263 |

* cited by examiner

REGULATION MECHANISM CAPABLE OF DYNAMICALLY ADJUSTING BALANCE OF TENSION OF TWO SIDES OF MULTI-GROOVE TRANSMISSION BELT BETWEEN DRIVING WHEEL AND DRIVEN WHEEL

BACKGROUND OF THE INVENTION

The present disclosure relates to a regulation mechanism capable of dynamically adjusting balance of tension on two sides of a multi-groove transmission belt between a driving wheel and a driven wheel. More particularly, the present disclosure provides a regulation mechanism including a pivot balance plate disposed on the transmission mechanism adjacent to the driving wheel; two smooth idlers and a multi-groove idler respectively pivotally connected with the pivot balance plate to respectively abut with outer side and inner side surfaces of the multi-groove transmission belt on the transmission mechanism; and a tension regulating rod rotatably disposed on the transmission mechanism and pivotally connected with the pivot balance plate. A user can rotate the tension regulating rod to dynamically adjust balance of the tension on the two sides of the multi-groove transmission belt, thereby making sure that the multi-groove idler, the driving wheel and the driven wheel are precisely engaged with the multi-groove transmission belt.

BACKGROUND OF THE INVENTION

In recent years, with economic progress and social development, modern people pay more attention to their own health and gradually spend more time to do exercise. However, urban life is very busy, it is not easy for most people to do outdoor exercise frequently; for this reason, the fitness industry is rapidly developed, and various types of exercise devices are available in market, thereby providing people to do indoor exercise for different targets, such as improvement of muscular endurance or cardiopulmonary function.

The following takes an exercise device for training muscular endurance as example for illustration. The exercise device usually includes a weight assembly (such as weight discs or bar pieces), and a user can apply force to pull the rope or handle against weight of the weight assembly; when the user raises the weight assembly through the rope or handle, the user's muscle groups are contracted. When the user reduces the force to make the weight assembly move downwardly, the user's muscle groups are relaxed gradually. By rising the weight discs or bar pieces of the weight assembly repeatedly, the user can work muscle groups to contract and relax repeatedly, thereby improving strength and endurance of the muscle groups.

The aforementioned exercise device is popular among fitness enthusiasts because of its simple structure, but it still has obvious drawbacks in actual use. The reason is described below. The conventional exercise device uses weight discs or bar pieces to provide resistance and the user exerts force to overcome the resistance to train muscle, but the maximum forces applied by muscle of the user at different statuses are different. Biceps of the user's arm is taken as example, the maximum force applied by biceps when the user's arm is bent is 1.5 times of that when the user's arm is straightened, that is, the maximum force applied by arm in bent status and straightened status are different. While the user operates the exercise device to repeatedly raise weight discs or bar pieces, the user bents and straights arm continuously, but a number of the weight discs or bar pieces cannot be changed based on the bent or straightened status of the user's arm. If the user selects the weight discs or the bar pieces with weight corresponding to the maximum force of the arm in the bent status, while the user is straightening the arm gradually, the user may strain muscle of arm because the weight discs or the bar pieces are too heavy for the straightened arm.

In order to solve aforementioned problem, the applicant has designed a transmission mechanism applied to a fitness device including a driving wheel and a driven wheel disposed on a main structure thereof, a multi-groove transmission belt wound on the driving wheel and the driven wheel, and a damper is disposed on an axle of the driven wheel. The user can drive a handle on the main structure by hands or legs, to apply force against resistance of the damper for training purpose.

However, the applicant finds a drawback of aforementioned fitness device in use. The fitness device may have unbalance of tension on the multi-groove transmission belt because of the manufacturing or assembly error, or elastic fatigue or misalignment of the multi-groove transmission belt, and the unbalance effect may cause that a plurality of convex sections formed on wheel faces of the driving wheel and the driven wheel cannot be engaged into a plurality of grooves of the multi-groove transmission belt, respectively. Each of the driving wheel and the driven wheel has a plurality of convex sections formed on the wheel face thereof and engaged with the multi-groove transmission belt, but abnormal wear may occur between the multi-groove transmission belt and the driving wheel and the driven when the multi-groove transmission belt is misaligned because of tension unbalance, and the abnormal wear may result in twist of the multi-groove transmission belt, and even the multi-groove transmission belt may be torn off and the fitness device may be damaged. As a result, the company may spend too much in repair and maintenance of the fitness device.

Therefore, what is need is to improve the structure of the aforementioned fitness device, so as to solve the problem that the transmission mechanism of the fitness device may be damaged because of the unbalance of tension on the multi-groove transmission belt caused by the manufacturing or assembly error.

SUMMARY OF THE INVENTION

In order to solve the problem that the transmission mechanism of the fitness device may be worn and damaged when the multi-groove transmission belt fails to precisely engage with the convex sections on the wheel faces of the driving wheel and the driven wheel because of the manufacturing or assembly error, the applicant develops a regulation mechanism capable of dynamically adjusting balance of tension on two sides of the multi-groove transmission belt between the driving wheel and driven wheel, according to years of practical development experience and multiple tests.

According to an embodiment, the present disclosure provides a regulation mechanism applied to a transmission mechanism which includes a driving wheel, a driven wheel and a damper. The driving wheel and the driven wheel are pivotally connected to a main structure of the transmission mechanism, and the driving wheel and the driven wheel are connected with each other through a multi-groove transmission belt. The damper is movably disposed on an axle of the driven wheel. When the driving wheel is driven to rotate the driven wheel through the multi-groove transmission belt, the damper is rotated with rotation of the driven wheel to provide the transmission mechanism with a preset damping function. The regulation mechanism includes a pivot balance plate, two smooth idlers, a multi-groove idler and a tension regulating rod. The pivot balance plate includes a near-center part pivotally connected to the main structure of the transmission mechanism adjacent to the driving wheel. The two smooth idlers are pivotally connected to a near-top part and a near-bottom part of the pivot balance plate, respectively, and spaced apart from each other by a first gap. The multi-groove transmission belt is wound on the driving wheel and passed through the first gap and then wound on the driven wheel, and smooth surfaces of the two smooth idlers are abutted with upper and lower outer side surfaces of the multi-groove transmission belt, respectively. The multi-groove idler is pivotally connected an end part of the pivot balance plate adjacent to the driven wheel, and spaced apart from each of the two smooth idlers by a second gap. The multi-groove transmission belt wound on the driving wheel is passed through the first gap and the second gaps in sequential order, and wound on the driven wheel, so that a surface of the multi-groove idler is abutted with an inner side surface of the multi-groove transmission belt, and a plurality of convex sections of the multi-groove idler are engaged into a plurality of grooves recessed on the inner side surface of the multi-groove transmission belt, one by one. The tension regulating rod includes an end rotatably disposed on the main structure of the transmission mechanism, and other end pivotally connected to the pivot balance plate adjacent to the top part of the pivot balance plate. The tension regulating rod is configured to regulate a position of the top part of the pivot balance plate when being rotated, thereby regulating a force which is applied on the outer side inner side surfaces of the multi-groove transmission belt by the two smooth idlers and the multi-groove idler, to dynamically adjusting balance of tension on two sides of the multi-groove transmission belt between the driving wheel and the driven wheel. As a result, the multi-groove transmission belt can be ensured to precisely engage with the multi-groove idler, the driving wheel and the driven wheel, so that the transmission mechanism can be operated stably to prevent from damage caused by excessive wear.

BRIEF DESCRIPTION OF THE DRAWINGS

The structure, operating principle and effects of the present disclosure will be described in detail by way of various embodiments which are illustrated in the accompanying drawings.

DETAILED DESCRIPTION OF THE PREFERRED EMBODIMENTS

Figure 1:
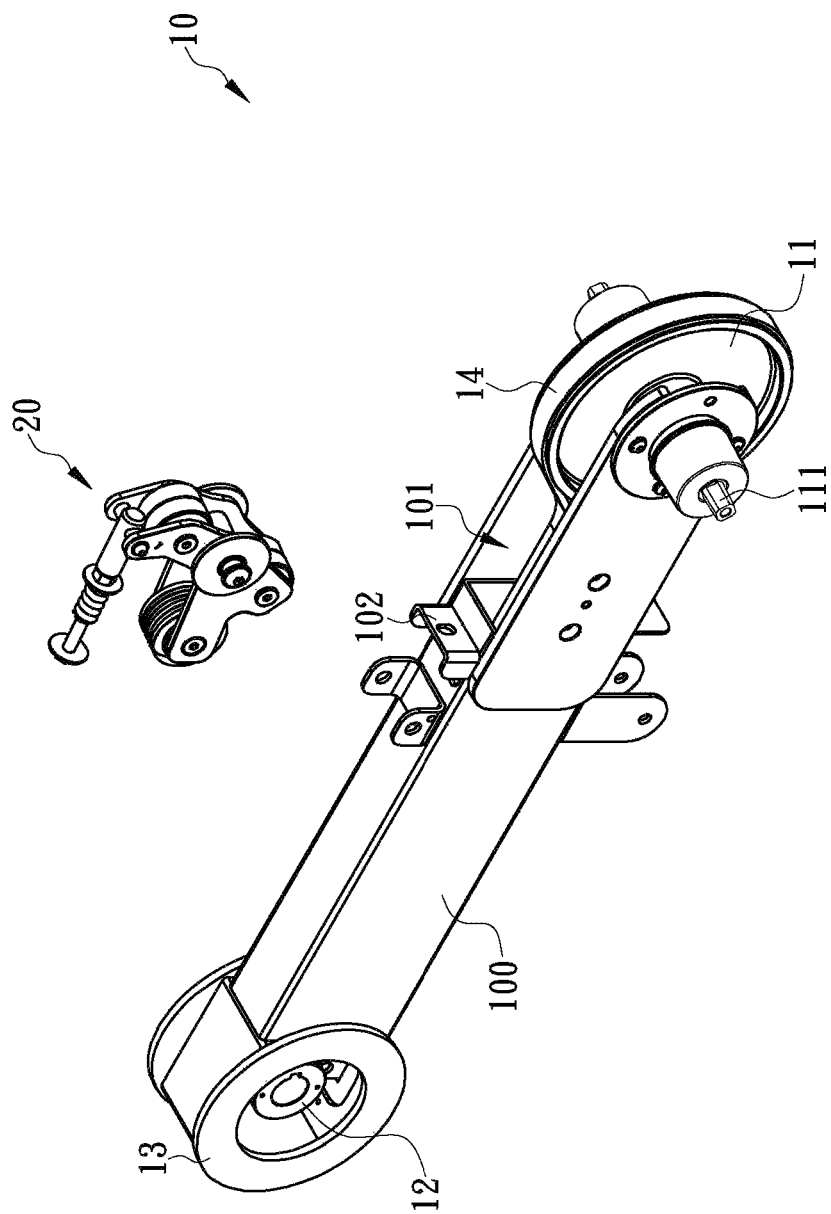
FIG. 1 is a schematic view of a regulation mechanism and a transmission mechanism using the same, in accordance with the present disclosure.

The following embodiments of the present invention are herein described in detail with reference to the accompanying drawings. These drawings show specific examples of the embodiments of the present invention. It is to be understood that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present invention. As used herein, the term "or" includes any and all combinations of one or more of the associated listed items.

Figure 2:
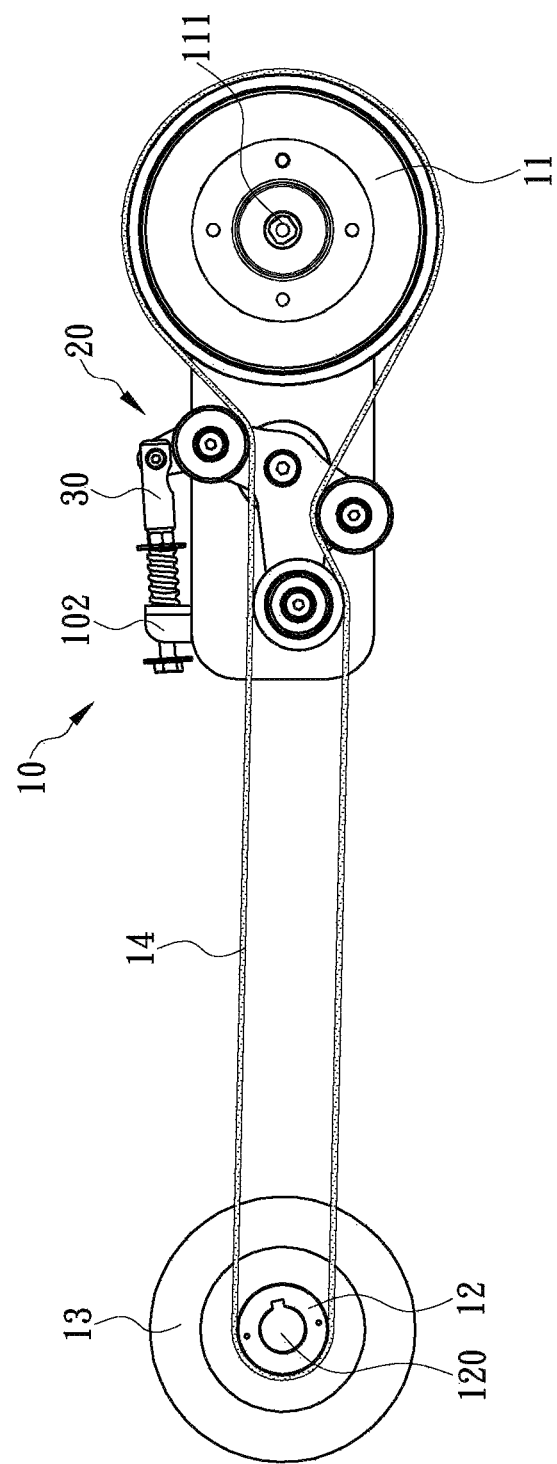
FIG. 2 is a schematic view of a part of the transmission mechanism of the present disclosure.

Please refer to FIGS. 1 and 2, which show a regulation mechanism capable of dynamically adjusting balance of tension on two sides of the multi-groove transmission belt between a driving wheel and a driven wheel. As shown in FIGS. 1 and 2, the regulation mechanism 20 is applied on a transmission mechanism 10 which includes driving wheel 11, a driven wheel 12 and a damper 13. The driving wheel 11 and the driven wheel 12 are pivotally connected on a main structure of the transmission mechanism 10, and each of the driving wheel 11 and the driven wheel 12 has multiple grooves formed on a surface thereof, so that the multi-groove transmission belt 14 can be wound on the driving wheel 11 and the driven wheel 12, thereby connecting the driving wheel 11 with the driven wheel 12.

The damper 13 is movably disposed on an axle 120 of the driven wheel 12, and when the driving wheel 11 is driven, the driven wheel 12 is simultaneously driven, through the multi-groove transmission belt 14, to rotate, so that the damper 13 can be rotated with the rotation of the driven wheel 12, to provide the transmission mechanism 10 with a preset damping function. Preferably, the damper 13 can be implemented by a hydraulic damper, but the present disclosure is not limited thereto.

Figure 3:
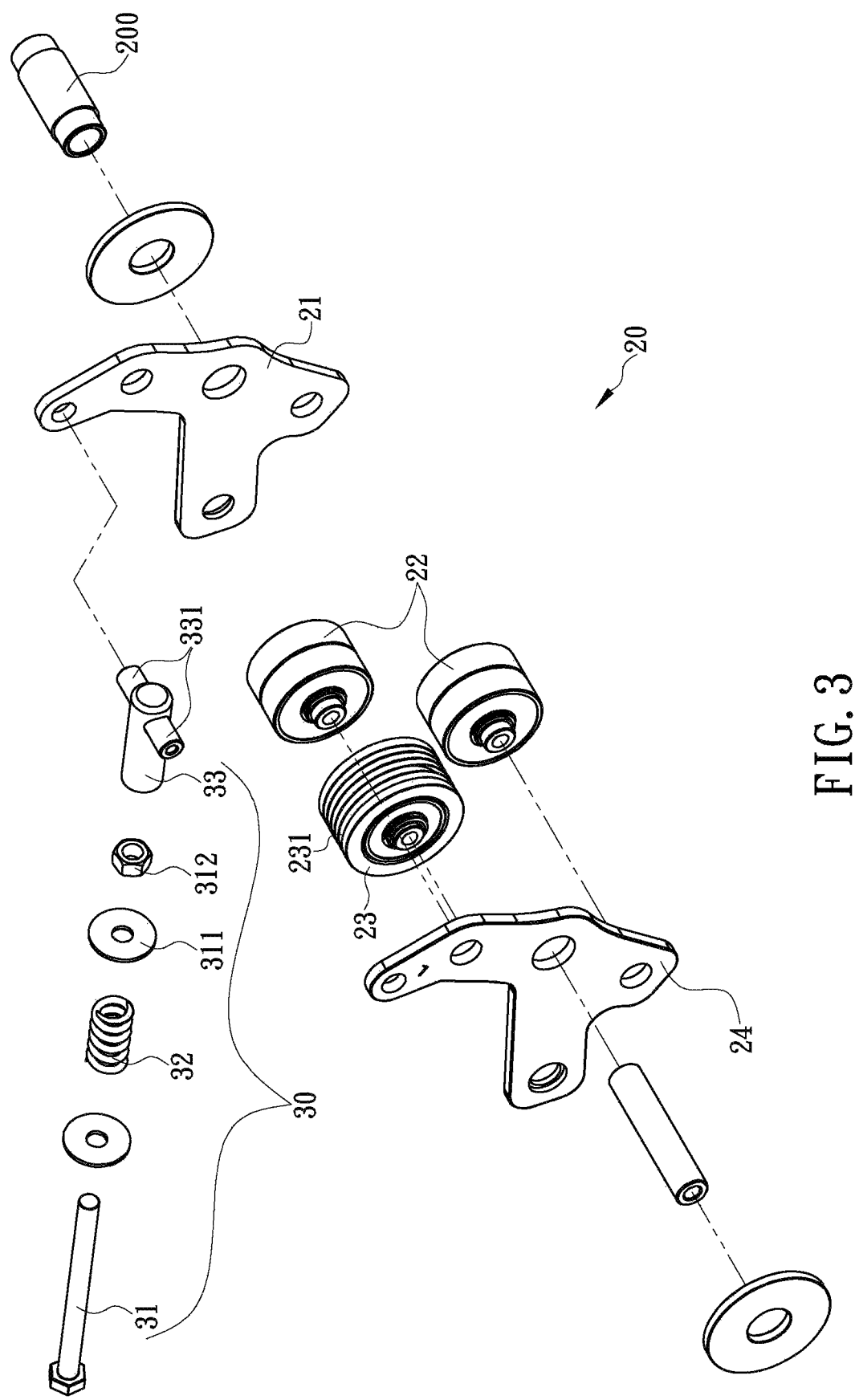
FIG. 3 is an exploded view of the regulation mechanism of the present disclosure.

Please refer to FIG. 1 through FIG. 3. The main structure of the transmission mechanism 10 includes an assembly frame 100 which has a mounting groove 101 formed thereon and adjacent to the driving wheel 11, and the regulation mechanism 20 is mounted in the mounting groove 101. The regulation mechanism 20 includes a pivot balance plate 21, two smooth idlers 22, a multi-groove idler 23 and a tension regulating rod 30. A near-center part of the pivot balance plate 21 is pivotally connected with the main structure of the transmission mechanism 10 and adjacent to the driving wheel 11. The two smooth idlers 22 are pivotally connected to near-top and near-bottom parts of the pivot balance plate 21 respectively, and the two smooth idler 22 are spaced apart from each other by a first gap; and, the multi-groove transmission belt 14 wound on the driving wheel 11, is passed through the first gap and then wound on the driven wheel 12, so that smooth surfaces of the smooth idlers 22 are respectively abutted with upper and lower outer side surfaces of the multi-groove transmission belt 14.

The multi-groove idler 23 is pivotally connected on an end portion of the pivot balance plate 21 adjacent to the driven wheel 12, and the multi-groove idler 23 is spaced apart from each of the smooth idlers 22 by a second gap, so that the multi-groove transmission belt 14 wound on the driving wheel 11 can pass the first gap and the second gap in sequential order, to wind on the driven wheel 12, and a surface of the multi-groove idler 23 can be abutted with an inner side surface of the multi-groove transmission belt 14, and a plurality of convex sections 231 protruded on the wheel face of the multi-groove idler 23 can be engaged with a plurality of grooves 141 recessed on the inner side surface of the multi-groove transmission belt 14 one by one. As a result, tension of the multi-groove transmission belt 14 can be effectively maintained by the multi-groove idler 23 and the two smooth idlers 22, thereby ensuring a reliable operation of the transmission mechanism 10.

The tension regulating rod 30 has an end rotatably fastened on the main structure of the transmission mechanism 10, for example, by a screwing manner; and other end pivotally connected to the near-top part of the pivot balance plate 21. When the tension regulating rod 30 is rotated, the other end of the tension regulating rod 30 can pull or push the pivot balance plate 21 to regulate a position of the top part of the pivot balance plate 21, so as to regulate the force applied on the outer and inner side surfaces of the multi-groove transmission belt 14 by the smooth idlers 22 and the multi-groove idler 23, and further dynamically adjust balance of tension on two sides of the multi-groove transmission belt 14 between the driving wheel 11 and the driven wheel 12.

Figure 4:
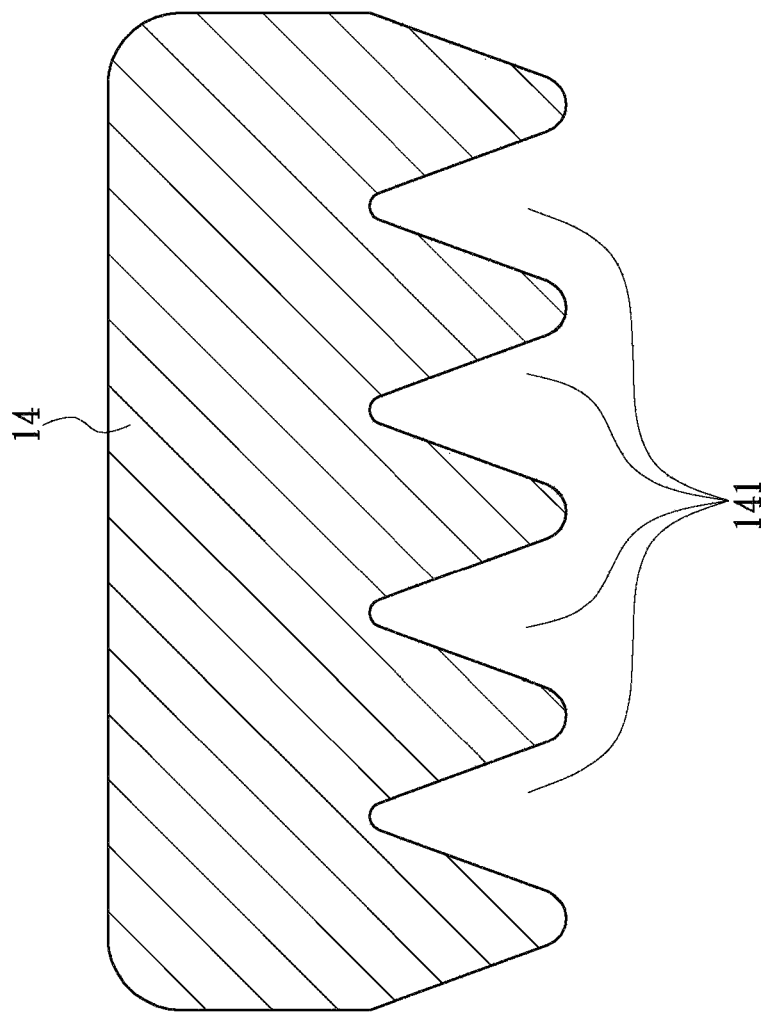
FIG. 4 is a cross-sectional schematic view of a multi-groove transmission belt of the present disclosure.

As a result, by means of operating the tension regulating rod 30, the plurality of convex sections of the multi-groove idler 23, the driving wheel 11 and the driven wheel 12 protruded on wheel faces thereof can be always precisely engaged with the plurality of grooves 141 (as shown in FIG. 4 which is a cross-sectional schematic view of the multi-groove transmission belt 14) recessed on the inner side surface of the multi-groove transmission belt 14 one by one; furthermore, the problem that the plurality of convex sections of the multi-groove idler 23, the driving wheel 11 and the driven wheel 12 cannot be precisely engaged with the plurality of grooves 141 recessed on the inner side surface of the multi-groove transmission belt 14, and wear damage occurs therebetween because of unbalance of tension on two sides of the multi-groove transmission belt 14 caused by manufacturing or assembly error of the driving wheel 11, the driven wheel 12 or the transmission mechanism 10, can be solved.

The tension regulating rod 30 can be rotated to change the position of the top part of the pivot balance plate 21, thereby adjusting the tension on the multi-groove transmission belt 14. Preferably, the structure and members of the tension regulating rod 30 can be adjusted, changed upon demand. The main technical key point of the present disclosure is the tension regulating concept of using the regulation mechanism 20; in actual application, the tension regulating rod 30 can regulate the tension of the multi-groove transmission belt 14 by a manner of changing rotation angle, displacement, or changing length. Please refer to FIG. 1 through FIG. 3. The tension regulating rod 30 can be moved to drive the pivot balance plate 21, and the following describes detailed structure and operation of the tension regulating rod 30. The tension regulating rod 30 includes a screw 31, an adjustment spring 32 and a sleeve 33. An end of the screw 31 is mounted on the main structure of the transmission mechanism 10, for example, the end of the screw 31 is locked on a retaining plate 102 adjacent to the mounting groove 101. A stop plate 311 is movably mounted with a middle section of the screw 31, and a regulation nut 312 is screwed on the screw 31 adjacent to other end of the screw 31.

The adjustment spring 32 is mounted on the screw 31, and two ends of the adjustment spring 32 are respectively abutted with the retaining plate 102 and the stop plate 311, so that the stop plate 311 can be pushed to the regulation nut 312 by a resilient recovering force of the adjustment spring 32. The sleeve 33 is mounted on the screw 31 adjacent to the other end of the screw 31, and has an end abutted with the regulation nut 312 and other end pivotally connected to the pivot balance plate 21 adjacent to the top part of the pivot balance plate 21. After the user rotates the regulation nut 312 to move the regulation nut 312 along the screw 31, the other end of sleeve 33 can be moved close to or away from the stop plate 311, to regulate the position of the top part of the pivot balance plate 21 (for example, the pivot balance plate 21 is pushed or pulled), thereby ensuring balance of the tension on two sides of the multi-groove transmission belt 14 between the driving wheel 11 and the driven wheel 12.

Please refer back to FIG. 1 through FIG. 3. In this embodiment, the regulation mechanism 20 may include an ancillary balance plate 24 which has a structure matching with the pivot balance plate 21. A pivot pin 200 respectively penetrates through near-central parts of the pivot balance plate 21 and the ancillary balance plate 24, to pivotally connect in the mounting groove 101. The ancillary balance plate 24 and the pivot balance plate 21 are pivotally connected with two opposite sides of the two smooth idlers 22 and the multi-groove idler 23, respectively, that is, near-top and near-bottom parts of the ancillary balance plate 24 can also be pivotally connected with the two smooth idlers 22, and an end part of the ancillary balance plate 24 adjacent to the driven wheel 12 can be pivotally connected with the multi-groove idler 23. The sleeve 33 has two pivoting parts 331 respectively extended from two opposite side of the other end thereof, and the pivoting parts 331 are pivotally connected to the pivot balance plate 21 and the ancillary balance plate 24 adjacent to top parts of the pivot balance plate 21 and the ancillary balance plate 24, respectively. As a result, by means of using the ancillary balance plate 24, the regulation mechanism 20 can be operated more stably.

The transmission mechanism 10 can be applicable to various kinds of exercise devices, for example, handles can be disposed on the axle 111 of the driving wheel 11, so that a user can rotate the handle by hand, leg or foot, and at this time, the user's force drives the driving wheel 11, and then drives the damper 13 through the multi-groove transmission belt 14 and the driven wheel 12, thereby training the user's muscular endurance. The manner of operating the exercise machine is well known in the art, so its description is not repeated in the present disclosure.

The present disclosure disclosed herein has been described by means of specific embodiments. However, numerous modifications, variations and enhancements can be made thereto by those skilled in the art without departing from the scope of the invention set forth in the claims.

What is claimed is:

1. A regulation mechanism, applied to a transmission mechanism comprising a driving wheel, a driven wheel and a damper, wherein the driving wheel and the driven wheel are pivotally connected to a main structure of the transmission mechanism, and the driving wheel and the driven wheel are connected with each other through a multi-groove transmission belt, and the damper is movably disposed on an axle of the driven wheel, and when the driving wheel is driven to rotate the driven wheel through the multi-groove transmission belt, the damper is rotated with rotation of the driven wheel to provide the transmission mechanism with a preset damping function, and the regulation mechanism comprises:

a pivot balance plate comprising a near-center part pivotally connected to the main structure of the transmission mechanism adjacent to the driving wheel;

two smooth idlers pivotally connected to a near-top part and a near-bottom part of the pivot balance plate, respectively, and spaced apart from each other by a first gap, wherein the multi-groove transmission belt is wound on the driving wheel and passed through the first gap and then wound on the driven wheel, and smooth surfaces of the two smooth idlers are abutted with upper and lower outer side surfaces of the multi-groove transmission belt, respectively;

a multi-groove idler pivotally connected to an end part of the pivot balance plate adjacent to the driven wheel, and spaced apart from each of the two smooth idlers by a second gap, wherein the multi-groove transmission belt wound on the driving wheel is passed through the first gap and the second gaps in sequential order, and wound on the driven wheel, and a surface of the multi-groove idler is abutted with an inner side surface of the multi-groove transmission belt, and a plurality of convex sections of the multi-groove idler are engaged into a plurality of grooves recessed on the inner side surface of the multi-groove transmission belt, one by one; and a tension regulating rod comprising an end rotatably disposed on the main structure of the transmission mechanism, and other end pivotally connected to the pivot balance plate adjacent to a top part of the pivot balance plate, and the tension regulating rod configured to regulate a position of the top part of the pivot balance plate when being rotated, thereby regulating a force which is applied to the outer side and inner side surfaces of the multi-groove transmission belt by the two smooth idlers and the multi-groove idler, to dynamically adjusting balance of tension on two sides of the multi-groove transmission belt between the driving wheel and the driven wheel.

2. The regulation mechanism according to claim 1, wherein the tension regulating rod comprises:

a screw comprising an end disposed on the main structure of the transmission mechanism, wherein a stop plate is movably mounted with a middle section of the screw, and a regulation nut is screwed with the screw adjacent to other end of the screw;

an adjustment spring mounted on the screw, and comprising two ends respectively abutted with the main structure and the stop plate, wherein the stop plate is pushed to the regulation nut by a resilient recovering force of the adjustment spring; and a sleeve mounted on the screw adjacent to the other end of the screw, and comprising an end abutted with the regulation nut and other end pivotally connected to the pivot balance plate adjacent to the top part of the pivot balance plate, wherein when the regulation nut is rotated to move along the screw, other end of the sleeve is moved close to or away from the stop plate, thereby regulating the position of the top part of the pivot balance plate.

3. The regulation mechanism according to claim 2, wherein the main structure of the transmission mechanism comprises a mounting groove formed adjacent to the driving wheel, and the regulation mechanism comprises an ancillary balance plate, and a pivot pin penetrates through near-center parts of the ancillary balance plate and the pivot balance plate to pivotally connect to the mounting groove, and the ancillary balance plate and the pivot balance plate are pivotally connected to two opposite side surfaces of the twos smooth idler and the multi-groove idlers, respectively; wherein the sleeve comprises two pivoting parts respectively extended from two opposite part of other end thereof, and the pivoting parts are pivotally connected to the pivot balance plate and the ancillary balance plate adjacent to the top parts of the pivot balance plate and the ancillary balance plate, respectively.

4. The regulation mechanism according to claim 3, wherein the main structure of the transmission mechanism comprises a mounting groove formed adjacent to the driving wheel, and the regulation mechanism is mounted in the mounting groove.

* * * * *